May 16, 1961  R. F. McCORMICK ET AL  2,984,257
PILOT-OPERATED FOUR-WAY VALVE
Filed July 10, 1957  3 Sheets-Sheet 3
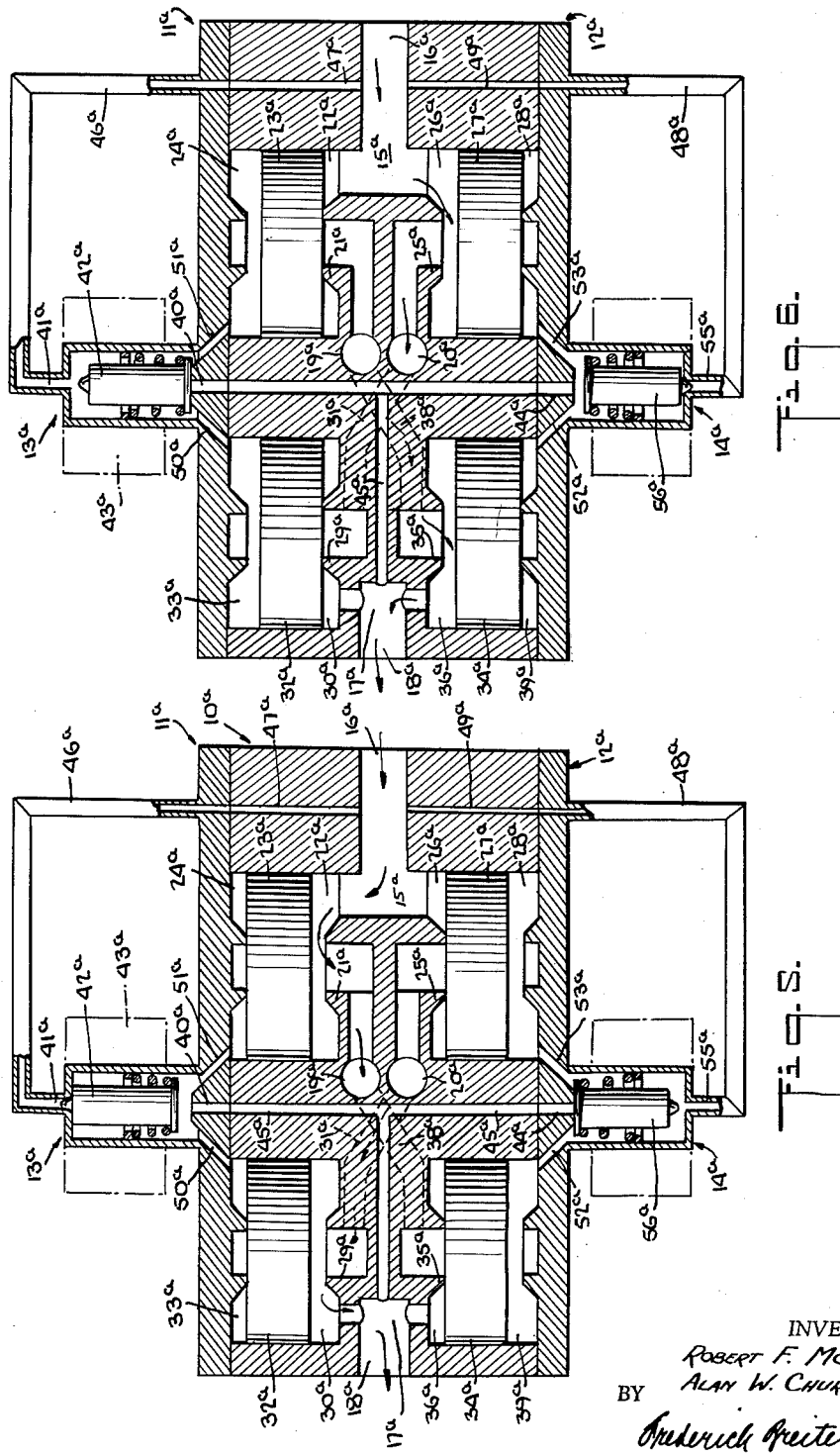
INVENTORS:
ROBERT F. McCORMICK
ALAN W. CHURCHILL
BY
Frederick Breitenfeld
ATTORNEY

United States Patent Office 2,984,257
Patented May 16, 1961

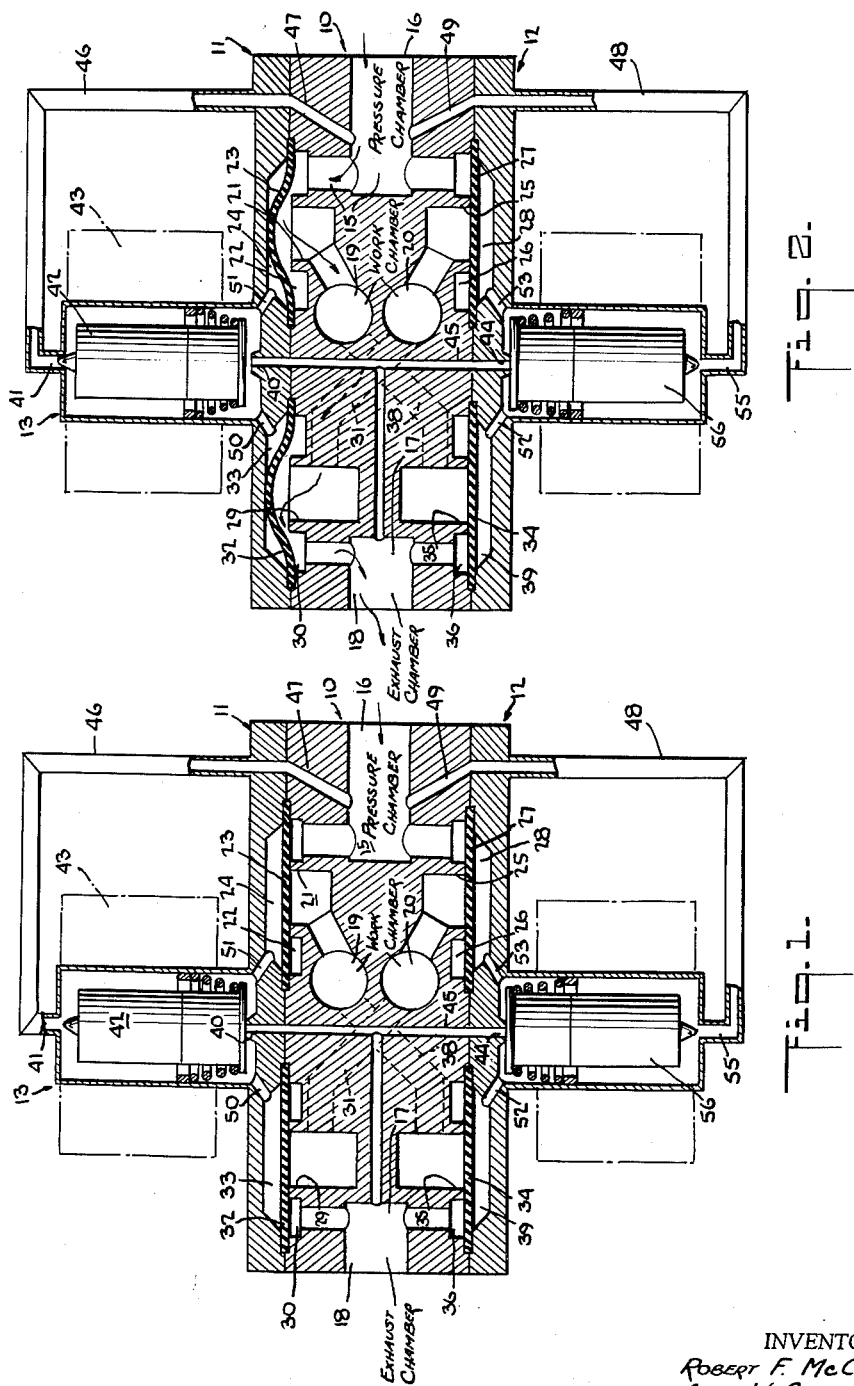

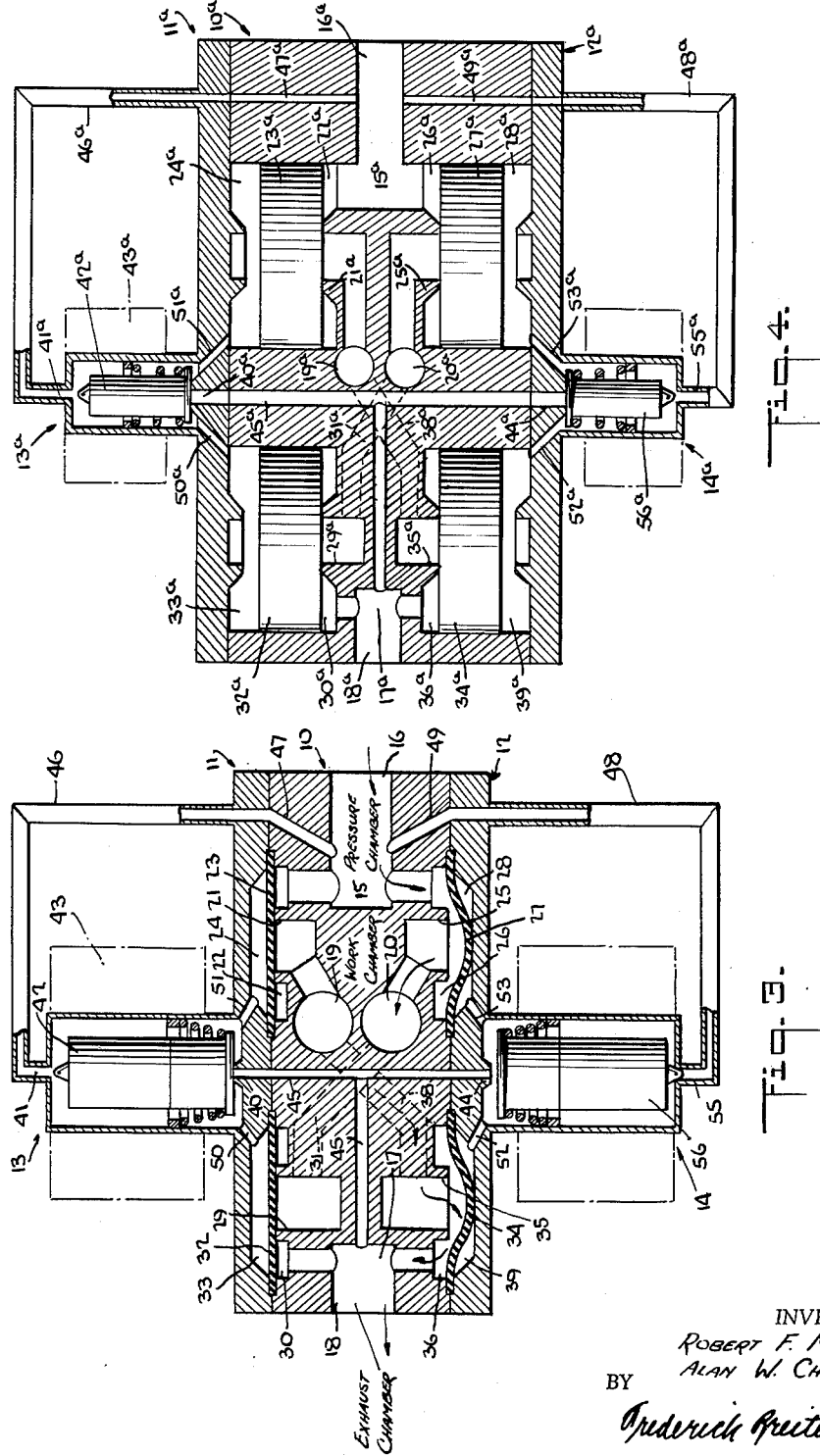

2,984,257

PILOT-OPERATED FOUR-WAY VALVE

Robert F. McCormick, Convent Station, and Alan W. Churchill, Caldwell, N.J., assignors to Automatic Switch Co., Florham Park, N.J., a corporation of New York Filed July 10, 1957, Ser. No. 671,099

7 Claims. (Cl. 137—622)

The present invention relates generally to valves, and has particular reference to certain improvements in four-way valves.

One of the common purposes of a four-way valve is to actuate a hydraulic or pneumatic cylinder, which in turn controls the operation of some element or mechanism which is to be reciprocated, for example, a gate valve, a molding press, a clamp, or the like. Stated more generally, a four-way valve serves to connect two work chambers alternately to a source of high pressure fluid and exhaust. These chambers may be, for example, those on the opposite sides of a piston in a hydraulic or pneumatic cylinder, the movements of the piston serving to control the piece or element which is to be reciprocated.

Constructions heretofore employed for this purpose have been of the slide-valve or spool type, or have involved valve elements mounted in tandem or on a common stem. In each case accurate machining is called for, and problems of precise alignment are presented. The same difficulty is encountered where actuation is by means of a differential piston arrangement. If springs are required to shift a spool type valve, additional limitations are imposed.

It is a general object of this invention to provide an improved construction which avoids these shortcomings. This object is achieved by means of a valve employing poppet-type valve elements and valve seats, and the desired advantages are attained, in part, by so designing and arranging the valve structure that each valve element is independent of the others and entirely disconnected therefrom.

By the term "poppet-type valve element" we intend to refer to any element that is mounted for movement toward and away from a valve seat, to seat and unseat itself with respect thereto, as distinguished from valve controlling means of the sliding type. Our improved construction preferably employs diaphragms one for each valve seat, but reciprocable pistons or similar elements may be employed, if desired.

One of the more specific objects of the invention is to provide an improved arrangement of parts whereby the valve will remain in any setting without dependence upon any energization of a pilot. One advantage of this lies in the fact that current failure becomes ineffective to alter the setting of the valve.

Other more general objectives of the improved construction are to lower the cost of manufacture, permit the valve to be more economically operated, employing either a gaseous or a liquid fluid, and to provide a relatively simple structure that has little tendency to stick or to become clogged, and which is consequently highly reliable in operation over long periods of time.

These general objects and advantages, and such other benefits as may hereinafter appear or be pointed out, may be achieved in the manner illustratively exemplified in the accompanying drawings, in which—

Fig. 1 is a semi-diagrammatic cross-sectional view through a four-way valve embodying the features of this invention, employing diaphragms as the valve elements, both pilot valve solenoids being de-energized;

Figs. 2 and 3 are views similar to Fig. 1, showing other settings of the valve; and Figs. 4–6 are views corresponding to Figs. 1–3, showing how piston-type valve elements may be employed.

The valve body may be constructed in any known appropriate manner. We have illustratively shown a central region 10 and end plates or elements 11 and 12 fitted thereon and secured in any appropriate manner. As is the custom in valve manufacture, these various parts may be castings in whole or part, or of other suitable structural nature. The resultant assembly is referred to hereinafter as the "main valve body."

Mounted on this main valve body are a pair of solenoid-operated pilot valves 13 and 14.

The main valve body is provided with interior partitions and structure to define a pressure chamber 15 adapted to be connected through the opening 16 with a source of fluid under pressure (not shown); an exhaust chamber 17 adapted to be connected through the opening 18 with the atmosphere or with some other appropriate point of low fluid pressure; and a pair of work chambers 19 and 20. These work chambers communciate with the exterior of the valve body, in known fashion, and are adapted to be connected, respectively, to the two cylinders intended to be controlled. For example, these may be the regions on the opposite sides of a piston, so that when high pressure fluid is introduced on one side and the opposite side is connected to exhaust the piston will move in one direction, while a reversal of the fluid connections will move the piston in the opposite direction.

Arranged between the work chamber 19 and the pressure chamber 15 is a valve seat 21. It surrounds a space in communication with the work chamber 19, and it is surrounded by an annular space 22 in communication with the pressure chamber 15. A diaphragm valve 23 is arranged in association with the valve seat 21. It is peripherally anchored in the region lying radially beyond the annular space 22, and it is thus provided with a marginal part that constitutes a barrier between the annular space 22 and the region 24 behind the valve.

The work chamber 20 is similarly in communication with the space terminating in the valve seat 25. Surrounding the latter is an annular space 26 which is in communication with the pressure chamber 15. A peripherally anchored diaphragm valve 27 is mounted to seat and unseat itself with respect to the valve seat 25. It is provided with a part that serves as a barrier between the annular space 26 and the region 28 behind the valve.

Since each of the valves 23 and 27 controls the introduction of pressure fluid into one of the work chambers, these valves will be hereinafter designated as "pressure" valves.

A similar valving arrangement is associated with the exhaust chamber 17. A valve seat 29 surrounds a space in communication at 31 with the work chamber 20, and is itself surrounded by an annular space 30 which communicates with the exhaust chamber 17. A diaphragm valve element 32 is mounted to seat and unseat itself with respect to the valve seat 29, and it has a marginal region that is interposed between the annular space 30 and the region 33 behind the valve.

A similar diaphragm valve 34 cooperates with a valve seat 35 which surrounds a space communicating at 38 with the work chamber 19, and is surrounded by an annular space 36 communicating with the exhaust chamber 17. The diaphragm 34 has a marginal region which is a barrier between the annular space 36 and the region 39 behind the valve.

The solenoid-operated pilot valve 13 is provided at one end with the exhaust port 40, and at the opposite end with the pressure port 41. The armature 42 of the solenoid is mounted for reciprocation between the positions shown in Figs. 1 and 2. In Fig. 1 it is covering the exhaust port 40 and uncovering the pressure port 41; and in Fig. 2 the pressure port is covered and the exhaust port is uncovered. In the embodiment illustrated, a compression spring constantly urges the armature 42 into the position of Fig. 1, and the magnet coils of the solenoid (represented at 43) operate when energized to move the element 42 into the position of Fig. 2 against the urgence of the spring.

The pilot valve 14 is similarly constructed, being provided with the exhaust port 44, the pressure port 55, and the reciprocable solenoid armature 56.

The two exhaust ports 40 and 44 are in constant communication, through the internal passages 45, with the exhaust chamber 17. The pressure port 41 of the pilot valve 13 leads through the pipe 46 and the passage 47 to the pressure chamber 15. Similarly the pressure port 55 of the pilot valve 14 communicates through the pipe 48 and the passage 49 with the pressure chamber 15.

The regions 33 and 24 behind the valves 32 and 23, respectively, communicate with the interior of the pilot valve body 13 through the channels 50 and 51 respectively. It will be observed that the valve 23 is the pressure valve of work chamber 19, whereas the valve 32 is the "exhaust" valve of the work chamber 20. These valves may be said to be "paired" in that their actuation is simultaneously controlled by the pilot valve 13, as will be presently pointed out. Similarly "paired" is the pressure valve 27 of work chamber 20 and the "exhaust" valve 34 of work chamber 19. This is due to the fact that the interior of the pilot body 14 communicates at 52 with the region 39 behind the valve 34, and also communicates at 53 with the region 28 behind the valve 27.

In Fig. 1 the parts are shown in the positions they assume when the two pilot valves are both de-energized, allowing the solenoid armatures to cover both exhaust ports 40 and 44 and to open or uncover both pressure ports 41 and 55. Under these circumstances fluid under pressure from the pressure chamber travels through both pilot valve bodies and through the passages 50, 51, 52 and 53 to the regions behind all four valves, thus holding them all in seated condition. With respect to the pressure valves 23 and 27, it is true that pressure fluid lies beneath the marginal part of each valve, but the area of the valve on its rear side is larger, and thus the valves are kept closed.

With the parts in the relationships shown in Fig. 1, no fluid enters or leaves either of the work chambers, hence the cylinders controlled by these work chambers are in a static condition, and any mechanism controlled thereby is held in its then-existing setting. Where the valve construction is such that the solenoids assume the positions of Fig. 1 when they are de-energized, the static circumstances described are those which obtain upon power failure.

In accordance with our invention, the pilot valves are independently operable. Accordingly, when the pilot valve 13 is energized the solenoid armature 42 moves into the position shown in Fig. 2, covering the pressure port 41 and uncovering the exhaust port 40. This establishes an instantaneous communication between the regions 24 and 33 (behind the valves 23 and 32 respectively) and the exhaust chamber 17, as a result of which the valves 23 and 32 immediately assume the unseated positions shown. This allows pressure fluid to enter work chamber 19, and allows any fluid in work chamber 20 to flow to the exhaust. This flow of fluid is indicated by the arrows in Fig. 2. At any time during a continuation of this flow a deenergization of the pilot valve 13 will halt the flow almost immediately. This is because such deenergization brings pressure fluid, via passages 46, 41, 50 and 51, to the regions 24 and 33 behind the valves 23 and 32 respectively, and the counteracting pressure on the underside of the valve 23 is insufficient to prevent the valve from closing. This is so, because the pressure fluid on the underside of the valve is in a flowing condition and its static pressure is slightly reduced for this reason.

When the pilot valve 13 is restored to the position of Fig. 1, but the pilot valve 14 is actuated to seal its pressure port 55, the parts assume the positions shown in Fig. 3, from which it will be observed that fluid under pressure flows into work chamber 20 while any fluid in work chamber 19 is now permitted to flow to the exhaust. Here, too, at any time during a continuation of this flow, a deenergization of the pilot valve 14 will halt the flow by bringing static pressure fluid to the regions 28 and 39 behind the valves 27 and 34 respectively, and the flow of the fluid on the underside of the valve 27 creates a reduced pressure that allows the valve to close.

The same operations can be performed by the valve construction shown in Figs. 4–6. The only difference lies in the fact that each of the diaphragm elements has been replaced by a reciprocable piston adapted to move back and forth within a cylindrical bore. The several parts and chambers of Figs. 4–6 have therefore been designated with the same reference numerals as those employed in Figs. 1–3, except that each reference numeral has been associated with the letter "a." Because of the semi-diagrammatic representation of the structure, each piston has been shown as a solid element, but it will be understood that in actual practice a piston ring or equivalent annular element may be associated with each piston to facilitate the contemplated sliding movements.

Whether the valve elements are diaphragms or pistons, it will be observed that each of them is independent of the others. This greatly facilitates and simplifies manufacture, and makes it much easier and more economical to replace parts or make other repairs. Moreover, because of the complete disconnection of the several valve elements from one another the operation of the valve is subject to much less wear and tear, and the cost of operation is thus kept to a minimum, and the valves remain reliably operable for extraordinarily long periods of time.

In general, it will be understood that many of the details herein described and illustrated may be modified by those skilled in the art without necessarily departing from the spirit and scope of the invention as expressed in the appended claims.

Having thus described our invention and illustrated its use, what we claim as new and desire to secure by Letters Patent is:

1. In a pilot-operated four-way valve: a main valve body provided with interior structure defining an exhaust chamber, a pressure chamber adapted to be connected to a source of fluid under pressure, and two work chambers; a valve seat between each work chamber and the pressure chamber, a pressure valve for each of said valve seats mounted to seat and unseat thereon, said pressure valves each having approximately equal effective pressure areas on its opposite sides, another valve seat between each work chamber and the exhaust chamber, an exhaust valve for each of the last-mentioned valve seats mounted to seat and unseat thereon, said exhaust valves each having approximately equal effective pressure areas on its opposite sides a first pilot valve communicating directly with said pressure and exhaust chambers for seating and unseating the pressure valve of the first work chamber and simultaneously actuating the exhaust valve of the second work chamber in the same way, a second pilot valve communicating directly with said pressure and exhaust chambers for seating and unseating the pressure valve of the second work chamber and simultaneously actuating the exhaust valve of the first work chamber in the same way, and means for selectively operating said pilot valves together or independently.

2. A valve structure as set forth in claim 1, each of said pilot valves comprising a pilot valve body having opposed pressure and exhaust ports communicating respectively with said pressure and exhaust chambers, a reciprocable pilot valve element adapted in each setting to cover one of said ports and uncover the other, and a communication between the interior of the pilot valve body and the pair of valves to be simultaneously actuated by said pilot valve.

3. In a pilot-operated four-way valve: a main valve body provided with interior structure defining an exhaust chamber, a pressure chamber adapted to be connected to a source of fluid under pressure, and two work chambers; a valve seat between each work chamber and the pressure chamber, said valve seat surrounding a first space and being surrounded by an annular second space, one of said spaces leading to a work chamber and the other communicating with the pressure chamber, a pressure valve for each of said valve seats mounted to seat and unseat thereon and having a part forming an annular barrier between said annular space and the region behind the valve, said pressure valves each having approximately equal effective pressure areas on its opposite sides; another valve seat between each work chamber and the exhaust chamber, each of said last-mentioned valve seats surrounding a first space and being surrounded by an annular second space, one of said spaces leading to the exhaust chamber and the other leading to a work chamber, an exhaust valve for each of said last-mentioned valve seats mounted to seat and unseat thereon and having a part forming an annular barrier between said annular space and the region behind the valve, said exhaust valves each having approximately equal effective pressure areas on its opposite sides; a pair of pilot valve bodies each provided with opposed pressure and exhaust ports and a reciprocable pilot valve element adapted in each setting to cover one of said ports and uncover the other, each pressure port communicating with said pressure chamber and each exhaust port communicating with said exhaust chamber; and communications between (*a*) the interior of one pilot valve body and the regions behind the pressure valve of one work chamber and the exhaust valve of the other, and (*b*) the interior of the other pilot valve body and the regions behind the other pressure and exhaust valves.

4. A valve structure as set forth in claim 3, combined with electrical means for actuating each of said pilot valve elements independently of the other.

5. A valve structure as set forth in claim 3, in which each of the pressure and exhaust valves is a diaphragm valve whose anchored periphery lies radially beyond the annular space surrounding the valve seat.

6. A valve structure as set forth in claim 3, in which each of the pressure and exhaust valves is a piston valve, the main valve body being provided with cylindrical bores within which said piston valves reciprocate.

7. In a pilot-operated four-way valve: a main valve body provided with interior structure defining an exhaust chamber at one end and a pressure chamber at the other end, said body being provided intermediate its ends with a pair of laterally spaced separate work chambers; a pair of laterally outwardly facing valve seats in said body adjacent to opposite sides thereof respectively, each communicating between the adjacent work chamber and the pressure chamber, each of said valve seats surrounding a first space communicating with the adjacent work chamber and being surrounded by a second space communicating with the pressure chamber, a pressure valve for each of said valve seats mounted to seat and unseat thereon and having a part forming an annular barrier between said second space and the region on the outer side of the valve, said pressure valves each having approximately equal effective pressure areas on its opposite sides; an additional pair of laterally outwardly facing valve seats in said body adjacent to opposite sides thereof respectively, each communicating between the remote work chamber on the opposite side of said body and the exhaust chamber, each of said last-mentioned valve seats surrounding a first space communicating with the remote work chamber and being surrounded by a second space communicating with the exhaust chamber, a pair of exhaust valves for said additional valve seats respectively and mounted in said body to seat and unseat thereon and each having a part forming an annular barrier between said last-mentioned second space and the region on the outer side of the exhaust valve, said exhaust valves each having approximately equal effective pressure areas on its opposite sides; a pair of pilot-valve bodies on opposite sides of said valve body each provided with opposed pressure and exhaust ports and a reciprocable pilot-valve element adapted in each setting to cover one of said ports and uncover the other, each pressure port communicating with said pressure chamber and each exhaust port communicating with said exhaust chamber; communications between the interior of one pilot-valve body and the regions behind the adjacent pressure and exhaust valves, and communications between the interior of the other pilot-valve body and the regions behind the pressure and exhaust valves adjacent thereto.

References Cited in the file of this patent

UNITED STATES PATENTS

| | | |
|---|---|---|
| 2,376,918 | Hughes | May 29, 1945 |
| 2,569,881 | Davies | Oct. 2, 1951 |
| 2,583,185 | McLeod | Jan. 22, 1952 |
| 2,700,986 | Gunn | Feb. 1, 1955 |
| 2,911,005 | Adelson | Nov. 3, 1959 |